May 25, 1954     M. P. ROKOS     2,679,168
BACKLASH DEVICE
Filed April 6, 1953
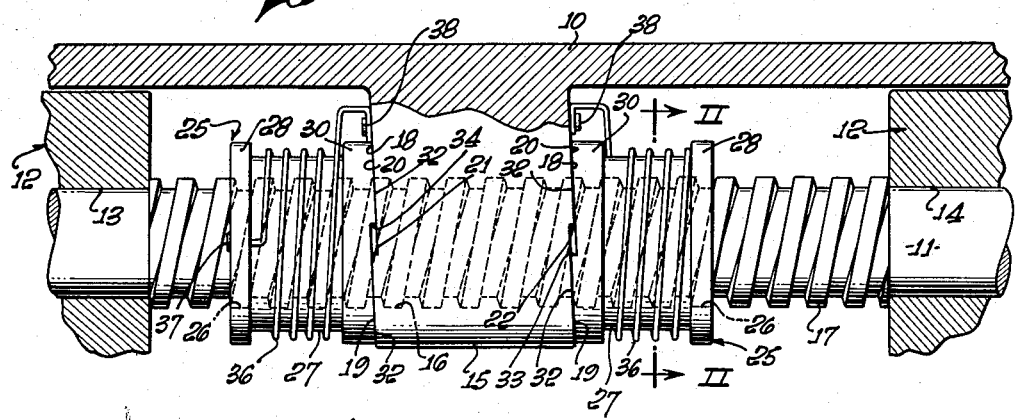
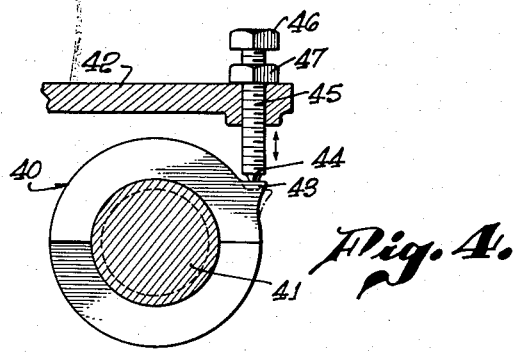
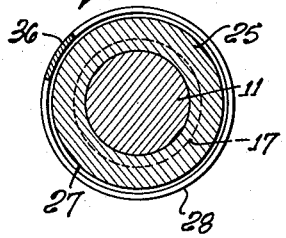
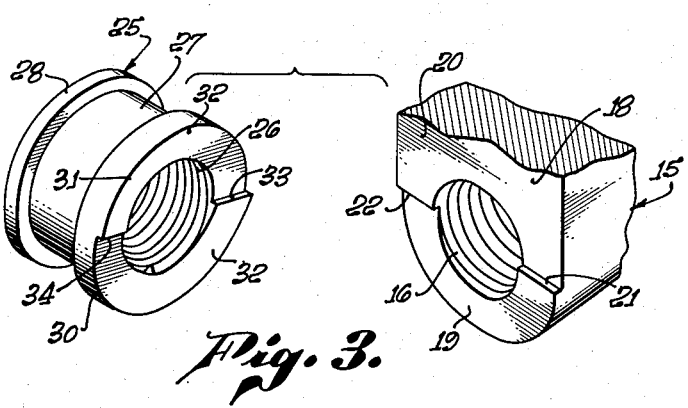
INVENTOR.
MICHAEL P. ROKOS,
BY
ATTORNEY.

Patented May 25, 1954

2,679,168

UNITED STATES PATENT OFFICE 2,679,168

BACKLASH DEVICE

Michael P. Rokos, Oakview, Calif.

Application April 6, 1953, Serial No. 346,997

11 Claims. (Cl. 74—441)

This invention relates to an automatic backlash takeup means or positive feed attachment for machine tools such as lathes, milling machines and the like. More particularly this invention contemplates an immediate, accurate, positive means for positioning a cutting tool with respect to a workpiece with automatic elimination of end or axial play of said tool.

In machine tools such as a lathe, for example, a cutting tool may be advanced and selectively positioned with respect to a workpiece by means of a feed screw. When positioned the cutting tool is usually secured by one or more lock nuts. Accurate positioning of the cutting tool requires a high degree of individual skill and care of the operator. Usually a lathe operator who has become familiar with a particular machine for a long period of time is able to accurately position the cutting tool by advancing the tool slightly beyond its ultimate cutting position and then retracting the tool slightly so as to take up play or slack between the feed nut on the tool slide member and the feed screw. The amount of advancement beyond ultimate selected cutting position depends entirely upon the personal experience and knowledge of the operator; this is particularly true in taper machining.

Under such conditions a lathe machine becomes almost a personal tool of a particular operator. If another operator were to use the lathe, a considerable amount of lost time and material would accumulate until the new operator acquired the necessary skill and familiarity with the particular machine. Obviously in any machine shop a change of personnel, even though the new operator may be a skilled machinist, results in lost production time on a machine because of the fact that the simple operation of moving a cutting tool to a selected point does not become the ultimate position of the tool for cutting. Obviously in work requiring the use of lathes, milling machine, etc. a cut too deep may completely ruin a workpiece while a plurality of shallow cuts will waste time.

The present invention contemplates an improvement on a backlash takeup device of the general character shown in United States Patent No. 2,610,519.

The primary object of this invention is to design and provide a backlash takeup device which is adapted for use on various types of machinery whereby a cutting tool may be quickly and accurately positioned without slack or end play in the tool feed mechanism.

Another object of the invention is to provide a backlash takeup attachment for a machine tool wherein a cutting tool may be accurately positioned with respect to a workpiece and end play, from which tool chattering may result, is eliminated as in a milling operation.

Another object of this invention is to design and provide a positive feed attachment for automatically eliminating slack between a feed screw and a feed nut means wherein a movable nut carried by the screw is advanceable in out-of-phase relationship with the feed screw and against the feed nut means so as to immediately and continuously prevent axial play between the feed screw and the feed nut means.

A further object of this invention is to provide a backlash takeup attachment for machinery wherein a fixed feed nut means associated with a tool slide member is cooperable with a movable nut adapted to engage in wedging relation opposed helicoidal face portions of the feed nut means upon movement of the feed nut means in a selected direction.

The invention contemplates a positive automatic feed attachment wherein a single feed nut means and a pair of spaced movable nuts on opposite sides thereof are threadingly mounted on a feed shaft and wherein opposed faces of the feed nut means and the movable nuts are provided with virtually corresponding semi-annular spirally inclined face portions adapted to cooperably engage so as to wedge a movable nut into out-of-phase relation with the feed nut means and to thereby prevent axial play of the feed nut means.

A still further object of this invention is to design a backlash takeup device as above-described wherein a torque force is imposed upon each of the movable nuts so that they are maintained in a normally preselected relationship with respect to the feed nut means.

A still further object of this invention is to design and provide such a positive feed attachment for a machine wherein a means are provided to disengage or unlock a movable nut in wedged engagement with feed nut means.

Generally speaking, this invention contemplates a means for automatically preventing axial play between a feed screw and a feed nut means associated with a cutting tool. A pair of spaced movable or floating nuts are carried by the feed screw on opposite sides of the feed nut means. The opposed end faces of the feed nut means and movable nuts each comprise a pair of helicoidal face portions defining diametrically opposite shoulders and provided with a pitch direction opposite to the pitch of advancement of the feed screw. Each movable nut carries an encircling coil spring having one end attached to the feed nut means and the other end attached to the movable nut whereby the spring imposes a torque force on the movable nut so as to normally maintain the opposed faces of the main nut and the fixed nut in a selected relationship whereby the helicoidal face portions are immediately effective in wedging relation to eliminate backlash. The coiled spring on each movable nut also serves to maintain each movable nut in operative position so that in either direction of tool feed, end play or slack is virtually immediately eliminated.

Other purposes and advantages of this invention will be readily apparent from the following description of the drawings in which an exemplary embodiment of the backlash takeup attachment of this invention is illustrated.

In the drawings:

Fig. 1 is a fragmentary sectional view of a feed mechanism for a machine tool embodying this invention, the section being taken generally in a vertical plane passing through the axis of the feed means.

Fig. 2 is a transverse sectional view taken in the plane indicated by line II—II of Fig. 1.

Fig. 3 is an exploded spread-apart perspective view of a movable nut and feed nut means illustrated in Fig. 1.

Fig. 4 is a fragmentary transverse sectional view showing a modification of this invention.

For brevity and clarity of explanation a machine tool such as a lathe may include a tool slide member 10 carried and advanced by a feed screw 11. The details of a cross-slide carriage and bed are not shown since they are well-known in the art. The feeding mechanism shown may be employed for various other machine tools such as a milling machine and the like. The tool slide member 10 is adapted to be longitudinally advanced and retracted by rotating a well-known type of feed handle (not shown) which may be connected to feed screw 11 in well-known manner.

The feed screw 11 may be journaled at opposite ends in carriage 12 as illustrated at 13 and 14. The tool slide member 10 may be provided with an integral depending feed nut means 15 which extends downwardly between journals at 13 and 14. A threaded bore 16 in the feed nut means 15 is adapted to threadably receive the threaded portion 17 of the feed screw 11 so that as the feed screw is rotated the feed nut means 15 will advance or retract the tool slide member 10 and the cutting tool carried thereby.

The feed nut means 15 is provided with opposite end faces 18 each end face 18 comprising a pair of helicoidal face portions 19 and 20. Each face portion 19 and 20 constitutes virtually a one-half turn or about 180° and each face portion may begin its spiral from virtually the same transverse plane lying perpendicular to the axis of the feed shaft. The face portions 19 and 20 begin and terminate at virtually a horizontal diameter of the bore 16, and form diametrically opposed and oppositely directed shoulders 21 and 22. The direction of pitch or lead of the helicoidal or spiroidal face portions is in a direction opposite to the pitch of threads of the feed screw.

A pair of spaced movable or floating nuts 25 may be threadedly carried by the feed shaft 11, the nuts 25 being disposed at opposite sides of the feed nut means 15. Each nut 25 is of virtually identical construction and for purposes of brevity only one nut 25 will be described in detail. Each nut 25 includes a threaded bore 26 having threads provided therein for threaded engagement with threads of the feed nut means 15 and of virtually the same pitch. Each nut 25 may include a cylindrical wall 27 provided with an annular rib 28 at one end thereof.

The opposite end of wall 27 may be provided with an annular rib 30 of somewhat thicker section than rib 28. On end face 31 of annular rib 30 is provided a pair of helicoidal face portions 32 beginning and terminating at diametrically opposed oppositely facing shoulders 33 and 34. The helicoidal face portions 32 correspond to face portions 19 and 20 of the feed nut means and are likewise pitched in a direction opposite to the pitch of the internal threads of the nut or the feed screw. The face portions 32 are cooperable in wedging relation with respective opposed face portions 19 and 20 of the feed nut means 15.

Each nut 25 carries a coil spring 36 sleeved over wall 27 between the annular ribs 28 and 30. One end of spring 36 may be secured in suitable manner as at 37 to rib 28 and the opposite end of spring means 36 may be secured in suitable manner as at 38 to the feed nut means 15. The spring 36 is suitably selected so as to impose a torque force on movable nut 25 sufficient to normally maintain the shoulders 21 and 22 on the feed nut means, the shoulders 33 and 34 on the movable nut in selected spaced relationship. The spring 36 as described hereinafter with respect to the operation of the feed attachment serves the purpose of not only preventing locking of the movable nut with respect to the feed nut means by abutment of said shoulders, but also provides a means for maintaining the movable nuts 25 in cooperative position with respect to the feed nut means when the tool slide member 10 is advanced or retracted. It should be noted that the spring biases the movable nut in the same direction as the feed or advancement of the tool, and because the helicoidal face portions are pitched in a direction opposite to the pitch of the threads of the feed screw, the spring maintains the face portions in contact.

In Fig. 1, for purposes of explanation of the operation of this positive feed attachment, a handle for feed shaft 11 (disposed to the left of Fig. 1) may be rotated clockwise to advance tool slide member 10 and feed nut means 15 to the right. Under such conditions nut 25 on the right of feed nut means 15 will be referred to as the leading movable nut.

As feed nut means 15 is advanced the leading movable nut 25 will tend to rotate with the shaft because of frictional engagement between the threads of the nut and of the feed screw. The helicoidal face portions on the movable nut 25 and on the feed nut means 15, already in contact because of the spring means are thus further relatively moved into wedging engagement. This results in the threads of the leading nut 25 being moved into out-of-phase relationship with the threads of the feed nut means 15 and with respect to the threads of the feed screw 11. Thus any slack existing in the threaded engagement of the feed nut means with the feed screw is automatically eliminated. The leading movable nut 25 after slack has been taken up by its wedging relation to the feed nut means, no longer rotates with the feed screw, but travels forwardly with the feed nut means which is advanced without the presence of slack and therefore end play is nonexistent when the advancement of the tool slide member is stopped. In addition, frictional forces developed between the interengaging helicoidal face portions prevents movement of the leading movable nut from its selected holding position during a cutting operation.

In the advancement of the feed nut means 15 the trailing movable nut 25 at first tends to rotate with the feed screw and frictional interengagement between the cooperative helicoidal face portions at the trailing side of the feed nut means is reduced or eliminated. The trailing movable nut 25 is caused to positively follow the feed nut means at close cooperative relationship by the resilient connection afforded by the associated coil spring 36. Thus in the event it is desired to retract tool slide member 10 a short distance to a different position of the cutting tool, the trailing nut means 25 is immediately operable to take up any slack or backlash which may be momentarily produced when the feed nut means is retracted.

It is understood that while there has been illustrated helicoidal face portions comprising generally a one-half turn or 180°, a plurality of helicoidal face portions of less than 180° may be utilized. In certain instances, it may be desirable to use only one helicoidal face portion forming one complete turn or 360°. It is also understood that while a coil spring is shown sleeved over each nut 25 and connected to the feed nut means, other resilient means may be used to bias the feed nut means into its selected relationship with respect to the feed nut means.

The fragmentary modification illustrated in Fig. 4 shows the manner in which a single movable nut may be employed with respect to a particular type of tooling machine such as a milling machine wherein the milling cutter is advanced in one direction only and wherein it is desired that end play be reduced and eliminated so as to prevent chattering of the cutting tool of the milling machine particularly in taper work.

In Fig. 4 the end face of a movable nut 40 is illustrated with a pair of helicoidal face portions formed thereon as in the prior embodiment. In this example the movable nut 40 is carried by a feed shaft 41 ahead of a tool slide member 42 which is directly associated with the milling head. Since movement in only one direction is of importance in this example nut 40 may not be equipped with a coil spring. In order to release a movable nut from locked frictional interengagement of the cooperative helicoidal face portions nut 40 may be provided with a step 43 at one side thereof affording an upwardly facing seat 44 for an end of an adjustable bolt 45 threadedly carried by the tool slide member 42. The bolt 45 includes a head 46 and a lock nut 47 so as to maintain the bolt 45 in selected position.

It will be apparent that by threading bolt 45 downwardly against seat 44 the movable nut 40 will be rotated to break any tight wedging engagement between the helicoidal face portions on the nut and on the feed nut means.

Assembly of the feed nut means and the movable nuts is accomplished by first placing the several parts in respective aligned operable positions and then threading the feed screw therethrough. This method of assembly is necessary because the helicoidal face portions are formed on the movable nuts in particular relation to the threads of the nuts so that the opposed face portions may contact while a selected space of, for example, ⅛" is provided between the opposed shoulders 21, 34 and 22, 33.

It should be particularly noted that the amount of reverse pitch of the helicoidal face portions with respect to the pitch of the threads of the feed screw may vary over a considerable range. An exemplary relationship of a reverse pitch of three threads per inch for the face portions when the pitch of the feed screw is five threads per inch has provided effective results without unnecessary wear on the threads. With this pitch relationship, each movable nut cannot be unthreaded from the feed screw independently of the feed nut means because the shoulders 21, 34, and 22, 33 will abut to limit further separation of the movable nut and feed nut means.

Frictional resistances between the threads of the feed screw and movable nuts 25 affects the operation of the device and depends partly upon the type of metal employed for the movable nut and the feed screw. A movable nut made of bronze and a feed screw made of heat treated 4140 steel provide an exemplary combination which affords a desired frictional resistance.

It will thus be readily understood that the cooperable relation of the helicoidal face portions on the movable nuts and the feed nut means positively, immediately, and automatically move the threads of the respective movable nut into out-of-phase relationship with the threaded engagement between the feed nut means and the feed screw in such a manner that end play or slack along the feed screw is eliminated. The provision of a movable nut on opposite sides of the feed nut means eliminates end play when the feed nut means is either advanced or retracted and the spring means carried by each movable nut effectively provides for operative positioning of the movable nuts so that end play is immediately and automatically eliminated.

All changes and modifications of the invention described above come within the scope of the appended claims, and embraced thereby.

I claim:

1. An immediately acting backlash takeup means for a tool feeding mechanism comprising in combination: a rotatable feed screw; a feed nut means threaded on said screw and adapted to be associated with a cutting tool to be positioned, said feed nut means having oppositely directed end faces; a pair of spaced movable nuts threaded on the feed screw with the feed nut means between said movable nuts; a pair of heliocoidal face portions on each end face of the feed nut means; a corresponding pair of helicoidal face portions on said movable nuts and opposed to said face portions on the feed nut means; said pairs of helicoidal face portions on said nut means and on said movable nuts being pitched in a direction opposite to the pitch of said feed screw; and a coil spring sleeved over each movable nut and connected at one end to the movable nut and at the other end to the feed nut means for biasing the movable nut in the opposite direction as the pitch of said face portions.

2. An immediately acting backlash takeup means for a tool feeding mechanism comprising in combination: a rotatable feed screw; a feed nut means threaded on said screw and adapted to be associated with a cutting tool to be positioned, said feed nut means having oppositely directed end faces; a pair of spaced movable nuts threaded on the feed screw with the feed nut means between said movable nuts; a plurality of helicoidal face portions on each end face of the feed nut means; a plurality of corresponding helicoidal face portions on said movable nuts in opposed relation to the face portions on the feed nut means; said helicoidal face portions on said feed nut means and said movable nuts being pitched in a direction opposite to the pitch of the feed screw; and a coil spring carried by each movable nut and connected to the feed nut means for biasing each movable nut in the same direction as the pitch of the feed screw and thereby moving face portions into wedging relation.

3. An immediately acting backlash takeup means for a tool feeding mechanism comprising in combination: a rotatable feed screw; a feed nut means threaded on said screw and adapted to be associated with a cutting tool to be positioned, said feed nut means having oppositely directed end faces; a pair of spaced movable nuts threaded on the feed screw with the feed nut means between said movable nuts; a plurality of helicoidal face portions on each end face of the feed nut means; a plurality of corresponding helicoidal face portions on said movable nuts in opposed relation to the face portions on the feed nut means; and said helicoidal face portions on said feed nut means and said movable nuts being pitched in a direction opposite to the pitch of the feed screw.

4. An immediately acting backlash takeup means for a tool feeding mechanism comprising in combination: a rotatable feed screw; a feed nut means threaded on said screw and adapted to be associated with a cutting tool to be positioned, said feed nut means having oppositely directed end faces; a pair of spaced movable nuts threaded on the feed screw with the feed nut means between said movable nuts; semi-annular inclined face portions on each end face of the feed nut means; semi-annular inclined face portions on said movable nuts for wedging cooperation with the face portions on the feed nut means; said face portions on the feed nut means and movable nuts being inclined in a direction opposite to the pitch of the feed screw; and spring means connected to said movable nuts for normally biasing said nuts into wedging relation with respect to the feed nut means.

5. An immediately acting backlash takeup means for a tool feeding mechanism comprising in combination: a rotatable feed screw; a feed nut means threaded on said screw and adapted to be associated with a cutting tool to be positioned, said feed nut means having oppositely directed end faces; a pair of spaced movable nuts threaded on the feed screw with the feed nut means between said movable nuts; semiannular inclined face portions on each end face of the feed nut means; semi-annular inclined face portions on said movable nuts for wedging cooperation with the face portions on the feed nut means; and said face portions on the feed nut means and movable nuts being inclined in a direction opposite to the pitch of the feed screw.

6. Means for preventing end play in a machine tool feeding mechanism comprising in combination: a rotatable feed screw; a feed nut means threaded on said screw and adapted to be associated with a cutting tool; a movable nut threaded on the feed screw in front of the feed nut means in its normal direction of advancement; a plurality of cooperable helicoidal face portions on opposed end faces of the feed nut means and movable nuts, said cooperable face portions being pitched rearwardly; and spring means carried by said movable nut for imposing a torque force on said nut in the direction of advancement of the pitch of the feed screw.

7. Means for preventing end play in a machine tool feeding mechanism comprising in combination: a rotatable feed screw; a feed nut means threaded on said screw and adapted to be associated with a cutting tool; a movable nut threaded on the feed screw in front of the feed nut means in its normal direction of advancement; and a plurality of cooperable helicoidal face portions on opposed end faces of the feed nut means and movable nut, said cooperable face portions being pitched rearwardly.

8. A means as described in claim 7 wherein means are carried by the feed nut means for releasing said movable nut from wedged engagement with said feed nut means.

9. Means for preventing end play in a machine tool feeding mechanism comprising in combination: a rotatable feed screw; a feed nut means threaded on said screw and adapted to be associated with a cutting tool; a movable nut threaded on the feed screw in front of the feed nut means in its normal direction of advancement; a plurality of cooperable helicoidal face portions on opposed end faces of the feed nut means and movable nuts, said cooperable face portions being pitched rearwardly; and means interconnecting said movable nut and said feed nut means for holding said movable nut in close proximity to said feed nut means.

10. Means for preventing end play in a machine tool feeding mechanism, comprising in combination: a rotatable feed screw, a feed nut means threaded on said feed screw and adapted to be associated with a cutting tool; said feed nut means having an end face; said feed nut means and said feed screw being provided with cooperable threaded portions pitched in one direction; a movable nut having means carried thereby pitched in a direction opposite to the threads of the feed screw and feed nut means; said movable nut having an end face for abutment against the end face of said feed nut means; and a spring biasing said movable nut against said feed nut means.

11. Means for preventing end play in a machine tool feeding mechanism, comprising in combination: a rotatable feed screw having threads pitched in one direction; a feed nut means threadedly engaging said feed screw and adapted to be associated with a cutting tool for advancing and retracting said cutting tool; and means for taking up slack between the feed screw and the feed nut means, said slack means including a movable nut having means pitched in a direction opposite to the direction of pitch of the feed screw; and means for biasing said movable nut into face-to-face abutment with said feed nut means.

No references cited.